United States Patent [19]
Yasue et al.

[11] Patent Number: 5,924,957
[45] Date of Patent: Jul. 20, 1999

[54] SPEED CHANGE CONTROL SYSTEM FOR AUTOMATIC TRANSMISSION

[75] Inventors: Hideki Yasue, Toyota; Hiromichi Kimura, Okazaki, both of Japan

[73] Assignee: Toyota Jidosha Kabushiki Kaisha, Toyota, Japan

[21] Appl. No.: 08/863,428

[22] Filed: May 27, 1997

[30] Foreign Application Priority Data

May 29, 1996 [JP] Japan .................................... 8-157556

[51] Int. Cl.$^6$ .................................................. F16H 61/08
[52] U.S. Cl. ........................................... 477/144; 477/143
[58] Field of Search .............................. 477/79, 80, 143, 477/144, 148, 156

[56] References Cited

U.S. PATENT DOCUMENTS

| | | | |
|---|---|---|---|
| 4,129,051 | 12/1978 | Shindo et al. | 477/148 |
| 4,476,747 | 10/1984 | Kawamoto | 477/146 |
| 4,616,521 | 10/1986 | Akashi et al. | 477/80 X |
| 4,854,195 | 8/1989 | Moroto et al. | 477/151 |
| 5,010,787 | 4/1991 | Takada et al. | 477/143 X |
| 5,095,775 | 3/1992 | Ueki | 477/151 |
| 5,201,251 | 4/1993 | Kitagawa et al. | 477/120 X |
| 5,454,763 | 10/1995 | Ikebuchi et al. | 477/120 X |
| 5,642,283 | 6/1997 | Schulz et al. | 477/143 X |
| 5,725,454 | 3/1998 | Yasue et al. | 477/155 |
| 5,730,683 | 3/1998 | Usuki et al. | 477/143 |
| 5,782,711 | 7/1998 | Tsutsui et al. | 477/143 X |

FOREIGN PATENT DOCUMENTS

4-228967  8/1992  Japan .

*Primary Examiner*—Charles A. Marmor
*Assistant Examiner*—Scott Lund
*Attorney, Agent, or Firm*—Oblon, Spivak, McClelland, Maier & Neustadt, P.C.

[57] ABSTRACT

A speed change control system for an automatic transmission which includes a plurality of frictional engagement elements and in which a first speed change unit for executing a clutch-to-clutch shift by applying/releasing two frictional engagement elements simultaneously and a second speed change unit for executing a speed change by applying a one-way clutch are connected in tandem. The decision is made upon both the clutch-to-clutch shift of the first speed change unit and the speed change, as effected by applying the one-way clutch of the second speed change unit. At the speed change time, the clutch-to-clutch shift is established before the application of the one-way clutch. According to the present invention, therefore, the clutch-to-clutch shift at the first speed change unit of the automatic transmission, as accompanied by the application of the one-way clutch at the second speed change unit, can be easily controlled to prevent the shift shock.

4 Claims, 6 Drawing Sheets

| SHIFT | GEAR STAGE | C1 | C2 | C3 | B1 | B2 | B3 | F1 | F2 |
|---|---|---|---|---|---|---|---|---|---|
| P |  | × | × | × | × | × | ○ | × | × |
| R |  | × | ○ | × | × | ○ | ○ | × | × |
| N |  | × | × | × | × | × | ○ | × | × |
| D | 1ST | ○ | × | × | × | × | ○ | △ | △ |
| D | 2ND | ○ | × | × | ○ | × | ○ | × | △ |
| D | 3RD | ○ | ○ | × | × | × | ○ | × | △ |
| D | 4TH | ○ | ○ | ○ | × | × | × | × | × |
| 2 | 1ST | ○ | × | × | × | × | ○ | △ | △ |
| 2 | 2ND | ○ | × | × | ○ | × | ○ | × | △ |
| L | 1ST | ○ | × | × | × | ○ | ○ | △ | △ |

SPEED CHANGE CONTROL SYSTEM FOR AUTOMATIC TRANSMISSION

BACKGROUND OF THE INVENTION

1. Field of the Invention

The present invention relates to a system for controlling the speed changes of an automatic transmission and, more particularly, to a control system for an automatic transmission including a first speed change unit for executing a clutch-to-clutch shift by applying/releasing two frictional engagement elements simultaneously and a second speed change unit for executing a speed change by a one-way clutch.

2. Related Art

In the prior art, there has been widely adopted an automatic transmission which is equipped with a gear speed change mechanism and a plurality of frictional engagement elements for switching torque transmission lines of the gear speed change mechanism. In the automatic transmission thus constructed, there may occur the clutch-to-clutch shift in which a predetermined speed change is executed by applying/releasing two frictional engagement elements simultaneously. In this clutch-to-clutch shift, a shift shock by a tie-up of the frictional engagement elements or an over-shoot of the engine may occur in dependence upon the propriety of the apply/release timings of the frictional engagement elements participating in the speed change. This makes it necessary to control the oil pressure for controlling the apply/release timings of the individual frictional engagement elements, in accordance with the progress of the shift. One example of this speed change control system is disclosed in JPA-4-228967.

The control system, as disclosed, is constructed to control the oil pressure of the frictional engagement elements participating in the clutch-to-clutch shift. The oil pressure of the applied side frictional engagement element is kept at a low level while the oil pressure of the released side frictional engagement element being reduced, and the oil pressures of these frictional engagement elements are then raised. At the same time, the slip of the applied side frictional engagement element is measured, and this slip state is controlled by controlling the oil pressure of the released side frictional engagement element. Finally, the applied side frictional engagement element is applied by raising its oil pressure.

As described above, the clutch-to-clutch shift has to be controlled while causing the oil pressures of the frictional engagement elements participating in the shift to relate to each other. Therefore, the oil pressures are controlled by detecting the slip state of the frictional engagement elements or by monitoring the RPM of the output shaft. However, the oil pressure being directly controlled and the oil pressure in the frictional engagement elements cannot be completely equalized. In addition, the viscosity of the oil changes with the temperature, and the coefficients of friction of the frictional engagement elements will change with time and have individual differences so that the torque capacities of the individual frictional engagement elements fail to shoot the targets. This may cause the shock due to the tie-up of the frictional engagement elements or the over-shoot of the engine.

SUMMARY OF THE INVENTION

A main object of the present invention is to provide a control system for enabling an automatic transmission having a first speed change unit and a second speed change unit connected in tandem to execute the clutch-to-clutch shift easily.

Another object of the present invention is to provide a control system for executing the clutch-to-clutch shift in the first speed change unit while considering the timing for the speed change, as effected by applying a one-way clutch, in the second speed change unit.

According to the present invention, there is provided a speed change control system for an automatic transmission which includes a plurality of frictional engagement elements and in which a first speed change unit for executing a clutch-to-clutch shift by applying/releasing two frictional engagement elements simultaneously and a second speed change unit for executing a speed change by applying a one-way clutch are connected in tandem. The control system comprises: speed change deciding means for deciding the clutch-to-clutch shift of the first speed change unit and the speed change, as effected by applying the one-way clutch of the second speed change unit; and speed change control means for establishing the clutch-to-clutch shift before the application of the one-way clutch when the speed change deciding means decides the speed change.

According to the present invention, therefore, the clutch-to-clutch shift to be effected by applying/releasing the two frictional engagement elements of the first speed change unit simultaneously is executed and ended while the one-way clutch of the second speed change unit is released. As a result, the torque fluctuation, if any in the first speed change unit, will not appear as the output torque of the automatic transmission so that the shift shock is not deteriorated. As a result, the shift control is facilitated while allowing some discrepancy in the apply/release timings of the frictional engagement elements participating in the clutch-to-clutch shift in the first speed change unit.

The above and further objects and novel features of the present invention will more fully appear from the following detained description when the same is read with reference to the accompanying drawings. It is to be expressly understood, however, that the drawings are for the purpose of illustration only and are note intended as a definition of the limits of the invention.

DESCRIPTION OF THE PREFERRED EMBODIMENT

Figure 2:
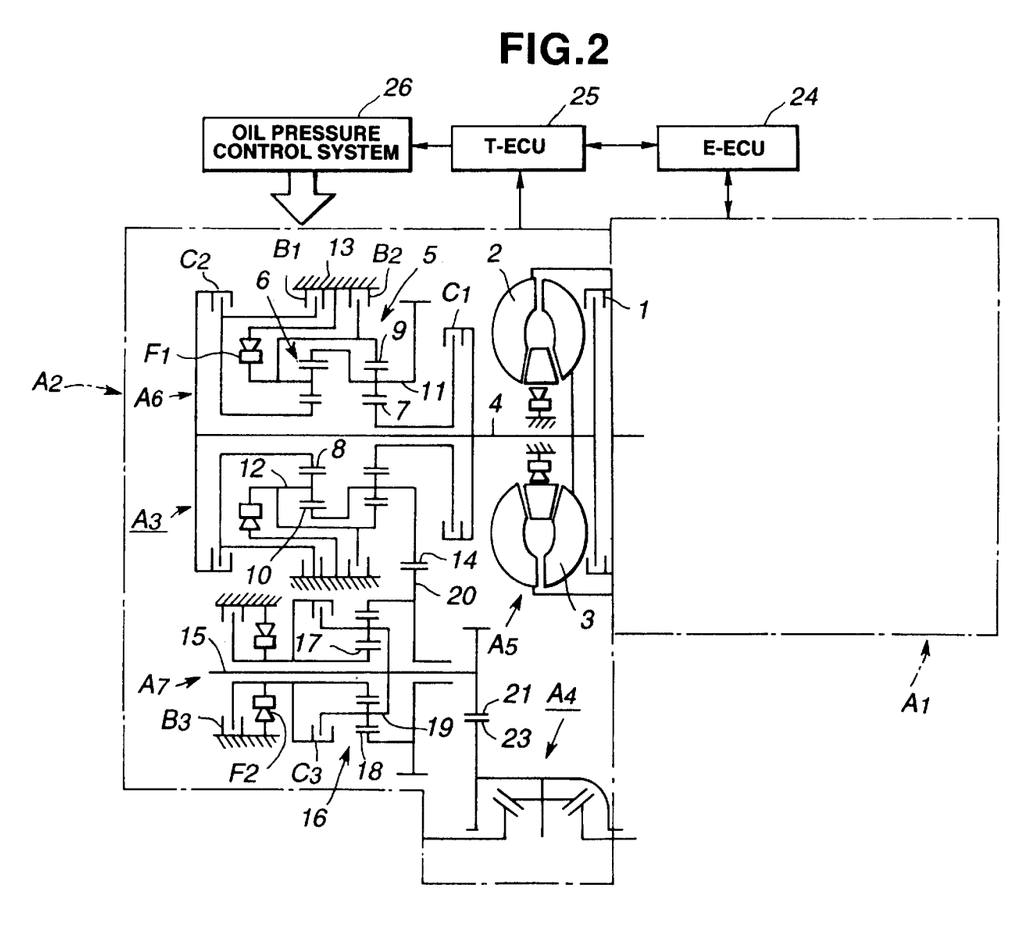
FIG. 2 is a schematic diagram showing a schematic construction of an automatic transmission, to which is applied the present invention, and a control system for the construction.

The present invention will be described in detail in connection with its one embodiment with reference to the accompanying drawings when it is applied to an automatic transmission for a front-engine front-drive type (FF) vehicle. FIG. 2 is a schematic diagram showing an automatic transmission, to which is applied the present invention, and a control system therefor. On a front portion of the (not-shown) vehicle, there is mounted an engine A1, at the output side of which is arranged a transaxle A2. These engine A1 and transaxle A2 are so transversely mounted on the vehicle that their center axes are oriented in the widthwise direction of the vehicle. In the transaxle A2, there are assembled an automatic transmission A3 and a final reduction gear mechanism A4.

In the automatic transmission A3, a torque converter A5, a first speed change unit A6 and a second speed change unit A7 are connected in tandem and consecutively in the recited order from the upstream to the downstream of the torque transmission line, and the second speed change unit A7 is connected to the final reduction gear mechanism A4. The torque converter A5 is equipped with a lockup clutch 1, a pump impeller 2 and a turbine runner 3, and is connected at its output side to the first speed change unit A6.

This first speed change unit A6 has the following construction. Specifically, the first speed change unit A6 includes an input shaft 4 connected to the turbine runner 3. In alignment with this input shaft 4, there are arrayed a first planetary gear mechanism 5 and a second planetary gear mechanism 6. These planetary gear mechanisms 5 and 6 are of the single pinion type, as individually constructed to have three components: sun gears 7 and 8; ring gears 9 and 10 or internal gears arranged concentrically of the sun gears 7 and 8; and carriers 11 and 12 retaining pinions meshing with those sun gears 7 and 8 and ring gears 9 and 10.

Of these planetary gear mechanisms 5 and 6, the carrier 11 of the first one 5, as located at the righthand side of FIG. 2, and the ring gear 10 of the left one 6 are so connected as to rotate together, and the ring gear 9 of the first one 5 and the carrier 12 of the second one 6 are so connected as to rotate together.

As a result of these connections of the carriers 11 and 12 and the ring gears 9 and 10, therefore, those first and second planetary gear mechanisms 5 and 6 are constructed to have totally four rotary elements: the integrated carrier 11 and ring gear 10, the integrated carrier 12 and ring gear 9, and the two sun gears 7 and 8.

Of these rotary elements, the sun gear 7 of the first planetary gear mechanism 5 is selectively connected to the input shaft 4 by a first clutch C1. There is further provided a second clutch C2 for connecting the sun gear 8 of the second planetary gear mechanism 6 selectively to the input shaft 4.

Between the sun gear 8 of the second planetary gear mechanism 6 and a casing 13 of the automatic transmission A3, on the other hand, there is interposed as brake means a first brake B1 for stopping the rotation of the sun gear 8 selectively. Between the ring gear 9 of the first planetary gear mechanism 5 and the carrier 12 of the second planetary gear mechanism 6, as integrated with each other, and the casing 13, moreover, there is interposed a second brake B2 for stopping the rotations of the ring gear 9 and the carrier 12 selectively. In parallel with this second brake B2, there is arranged a one-way clutch F1.

To another rotary element, i.e., the carrier 11 of the first planetary gear mechanism 5 and the ring gear 10 of the second planetary gear mechanism 6, as integrated with each other, there is attached a counter drive gear 14.

Here will be described the array of the aforementioned components. The first planetary gear mechanism 5 and the second planetary gear mechanism 6 are arranged adjacent to each other. The first clutch C1 is arranged between the first planetary gear mechanism 5 and the torque converter A5, and the counter drive gear 14 is arranged between the first clutch C1 and the first planetary gear mechanism 5. On the other hand, the second clutch C2 is arranged at the opposite side of the first clutch C1 across the individual planetary gear mechanisms 5 and 6. The one-way clutch F1 is arranged between the second clutch C2 and the second planetary gear mechanism 6.

Here will be specifically described the construction of the second speed change unit A7 which is connected in tandem with the first speed change unit A6. The second speed change unit A7 is equipped with a counter shaft 15 in parallel with the input shaft 4 of the first speed change unit A6. In alignment with this counter shaft 15, there is arranged a third planetary gear mechanism 16. This third planetary gear mechanism 16 is also the single pinion type, as constructed to have three components: a sun gear 17; a ring gear 18 or an internal gear arranged concentrically of the sun gear 17, and a carrier 19 retaining a pinion meshing with those sun gear 17 and ring gear 18.

Adjacent to the third planetary gear mechanism 16, there is arranged a counter driven gear 20 such that it is rotatable with respect to and in alignment with the counter shaft 15. The counter driven gear 20 is in meshing engagement with the counter drive gear 14. Moreover, the ring gear 18 of the third planetary gear mechanism 16 is so connected as to rotate together with the counter drive gear 20, and the carrier 19 is so connected as to rotate together with the counter shaft 15.

Between the sun gear 17 and the carrier 19 of the three components of the third planetary gear mechanism 16, there is interposed a third clutch C3 for connecting the sun gear 17 and the carrier 19 selectively. Between the sun gear 17 and the casing 13, moreover, there is arranged a third brake B3 for stopping the rotation of the sun gear 17 selectively. Between the sun gear 17 and the casing 13, there is further arranged a one-way clutch F2 which is juxtaposed to the third brake B3.

To the righthand end portion, as seen in FIG. 2, of the counter shaft 15, that is, to the end portion at the side of the torque converter A5, there is attached an output gear 21 which is in meshing engagement with a ring gear 23 of the final reduction gear mechanism A4.

In the automatic transmission A3 thus constructed, the torque, as outputted from the engine A1 and transmitted to the automatic transmission A3, is transmitted from the torque converter A5 to the first speed change.unit A6 and further from the first speed change unit A6 to the second speed change unit A7 until it is transmitted to the final reduction gear mechanism A4 so that the (not-shown) wheels are driven to run the vehicle.

Figure 3:
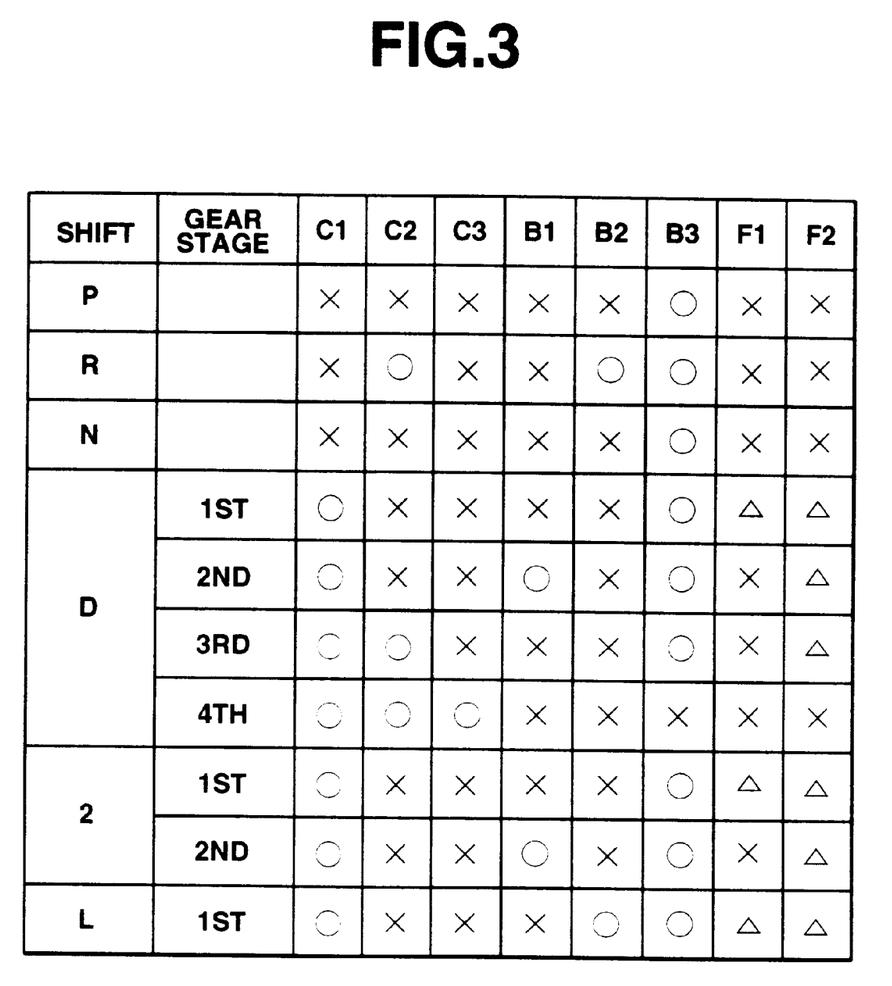
FIG. 3 is a clutch/brake application chart tabulating the applied/released operations of frictional engagement elements for setting the individual gear stages in the automatic transmission of FIG. 2.

This automatic transmission A3 can set four forward and one reverse gear stages by applying/releasing the frictional engagement elements, as tabulated in the apply/release chart of FIG. 3. In FIG. 3: symbols ○ indicate the applied state; symbols X indicate the released state; and symbols Δ indicate the applied state to be taken only at the drive time. Moreover: letter P designates a parking range; letter N designates a neutral range; letter R designates a reverse range; letter D designates a drive range; numeral "2" designates a "2" range for an upshift up to a second speed; and letter L designates a low range for setting a first speed for generating the engine braking force. These individual ranges are selected by operating the (not-shown) shift lever.

Here will be described the control system for the engine A1 and the automatic transmission A3. The fuel injection rate and the ignition timing of the engine Al are controlled by an engine electronic control unit (E-ECU) 24. This electronic control unit 24 is constructed of a microcomputer which is composed mainly of a central processing unit (CPU), a memory unit (RAM, ROM) and an input/output interface. To this electronic control unit 24, there are inputted as control data the detection signals including an engine RPM, an intake air rate, an intake air temperature, an accelerator opening and an engine water temperature.

With the engine electronic control unit 24, on the other hand, there is so connected an automatic transmission electronic control unit (T-ECU) 25 for controlling the automatic transmission A3 as to perform data communications. This automatic transmission electronic control unit 25 is constructed of a microcomputer which is composed mainly of a central processing unit (CPU), a memory unit (RAM, ROM) and an input/output interface. To the electronic control unit 25, there are inputted the control detection signals of the shift position, the pattern select switch, the overdrive switch and the manual shift switch, the output shaft RPM and the turbine RPM.

Moreover, the automatic transmission electronic control unit 25 is electrically connected with an oil pressure control system 26 for controlling the apply/release of the frictional engagement elements in the automatic transmission A3. The gear stages of the automatic transmission A3 are changed by a control signal, as outputted from the automatic transmission electronic control unit 25 to the oil pressure control 26.

Specifically, the automatic transmission electronic control unit 25 is stored in advance with a shift map for the shift control of the gear stages of the automatic transmission A3 and the ON/OFF control of the lockup clutch 1 on the basis of the running state including the accelerator opening and the vehicle speed.

Figure 4:
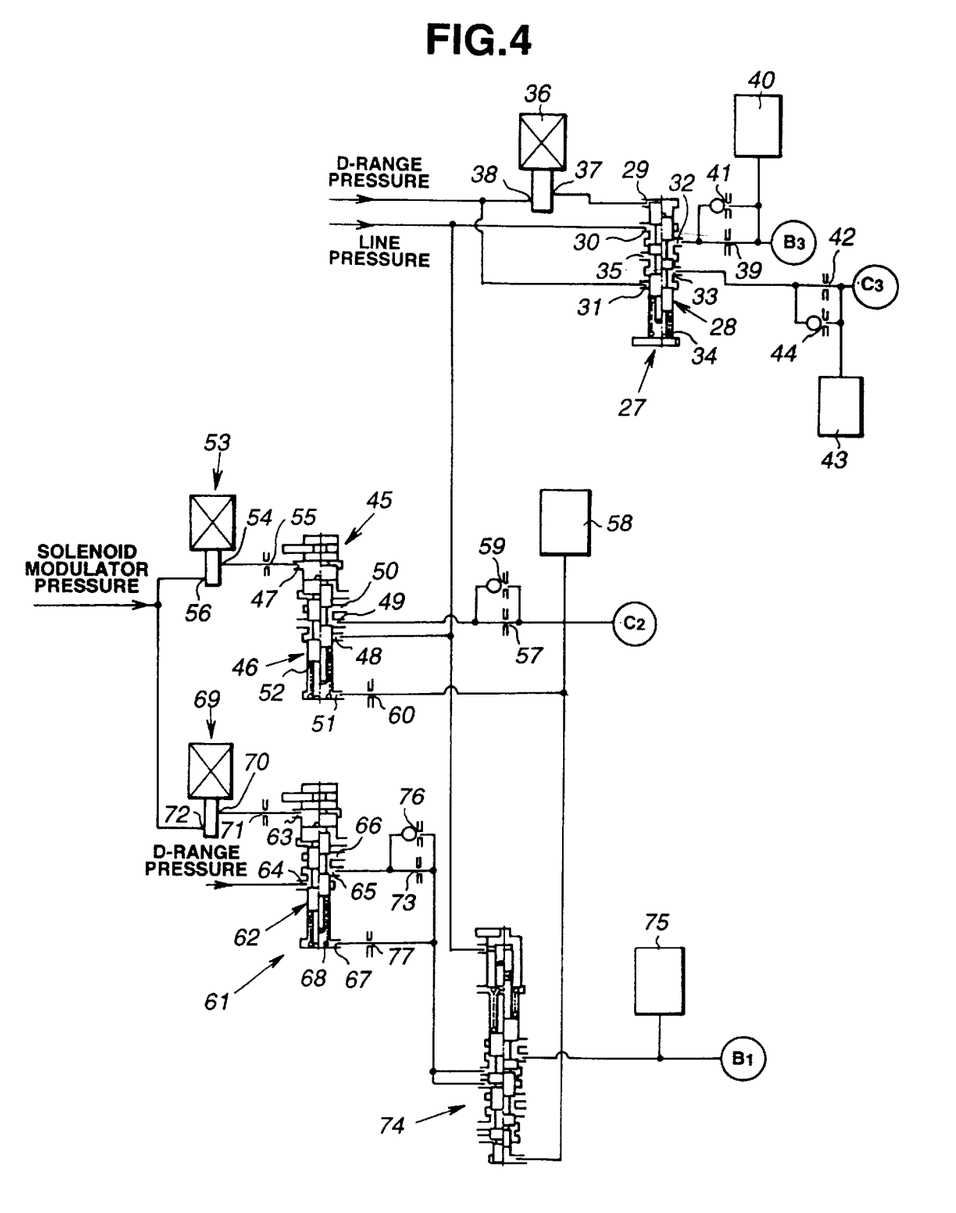
FIG. 4 is a schematic diagram showing a portion of an oil pressure control system to be used for controlling the automatic transmission of FIG. 2.

FIG. 4 is a schematic diagram showing a portion of the oil pressure control system 26, that is, a portion, as corresponding to the second clutch C2 and the third clutch C3, of the frictional engagement elements for setting the fourth speed of the automatic transmission A3, and a portion, as corresponding to the first brake B1 and the third brake B3, of the frictional engagement elements for setting the second speed of the automatic transmission A3.

First of all, a 3-4 shift valve 27 for controlling the apply/release of the third brake B3 and the third clutch C3 is equipped with: an axially movable spool 28; a control port 29 formed to face one end side of the spool 28; a line pressure input port 30 to be fed with a line pressure; a D-range pressure input port 31 to be fed with a D-range pressure from the (not-shown) manual valve; a clutch port 33 to be selectively opened/closed to the D-range pressure input port 31 according to the movement of the spool 28; a spring 34 arranged at the other end side of the spool 28 for urging the spool 28 toward the control port 29; and a drain port 35 for draining the third brake B3 or the third clutch C3.

To the control port 29, there is connected the output port of an ON/OFF controlled normally closed type solenoid valve 36, which is fed at its input port 38 with the D-range pressure. The solenoid valve 36 is ON/OFF controlled by the automatic transmission electronic control unit 25 so that its signal pressure is outputted from the output port 37 and applied to the control port 29.

With the solenoid valve 36 being OFF, therefore, the spool 28 is urged toward the control port 29 by the spring 34, as shown at the lefthand half of FIG. 4, to provide communications between the line pressure input port 30 and the brake port 32 and between the output port 33 and the drain port 35. With the solenoid valve 35 being ON, on the other hand, the spool 28 is moved downward by the signal pressure acting on the control port 29 against the urging force of the spring 34, as shown at the righthand half of FIG. 4, to provide communication between the D-range pressure input port 31 and the clutch port 33.

The brake port 32 of the 3-4 shift valve 27 is connected via an orifice 39 with the third brake B3 and an accumulator 40. In parallel with the orifice 39, there is provided an orifice 41 having a check ball, as opened when the third brake B3 is drained. Moreover, the clutch port 33 of the 3-4 shift valve 27 is connected via an orifice 42 with the third clutch C3 and an accumulator 43. In parallel with the orifice 42, there is provided an orifice 44 having a check ball, as opened when the third clutch C3 is drained.

On the other hand, a control valve 45 for controlling the apply/release of the second clutch C2 is equipped with: an axially movable spool 46; a control port 47 formed to face one end side of the spool 46; a line pressure input port 48 to be fed with the line pressure; a clutch port 49 and a drain port 50 to be selectively connected with the line pressure input port 48; a feedback port 51 formed to face the other end side of the spool 46; and a spring 52 arranged at a portion where the feedback port 51 is opened, for urging the spool 46 toward the control port 47.

Moreover, a normally open type solenoid valve 53 is connected at its output port 54 with the control port 47 via an orifice 55 and is fed at its input port 56 with the throttle modulator pressure. This solenoid valve 53 is duty-controlled by the automatic transmission electronic control unit 25 so that a signal pressure according to the duty ratio is outputted from the output port 54 and applied to the control port 47.

In the control valve 45, therefore, the signal pressure according to the duty ratio of the solenoid valve 53 acts upon the control port 47, and in addition the output pressure acts upon the feedback port 51. As a result, the pressure regulating level changes with the signal pressure, as fed to the control port 47, so that the control valve 45 regulates the line pressure in accordance with the pressure regulating level and outputs the regulated line pressure. In the OFF state with the signal pressure being at the maximum, on the other hand, the spool 46 is pushed down to the position, as shown at the lefthand half of FIG. 4, so that the line pressure is outputted as it comes. In the state with no signal pressure acting upon the control port 47, on the contrary, the spool 46 is pushed up to the position, as shown at the righthand half of FIG. 4, to connect the output port 49 with the drain port 50.

The clutch port 49 of the control valve 45 is connected via an orifice 57 wit the second clutch C2 and a damper 58. This damper 58 is provided for leveling the oil pressure to be applied to the second clutch C2 and is constructed to include a piston and a spring. In parallel with the orifice 57, there is further provided an orifice 59 having a check ball, as opened when the second clutch C2 is drained. Moreover, the feedback port 51 of the control valve 45 is connected via an orifice 60 with the second clutch C2 and the damper 58.

On the other hand, a control valve 61 for controlling the apply/release of the first brake Bl is equipped with: an axially movable spool 62; a control port 63 formed to face one end side of the spool 62; a D-range pressure input port 64 to be fed with the D-range pressure; an output port 65 to be selectively connected with the D-range pressure input port 64; a drain port 66 to be selectively connected with the output port 65; a feedback port 67 formed to face the other end side of the spool 62; and a spring 68 arranged at a portion where the feedback port 67 is opened, for urging the spool 62 toward the control port 63.

On the other hand, a normally open type solenoid valve 69 is connected at its output port 70 with the control port 63 via an orifice 71 and is fed at its input port 72 with the throttle modulator pressure. This solenoid valve 69 is duty-controlled by the automatic transmission electronic control unit 25 so that the signal pressure according to the duty ratio is outputted from the output port 70 and applied to the control port 63.

In the control valve 61, therefore, the signal pressure according to the duty ratio of the solenoid valve 69 acts upon the control port 63, and in addition the output pressure acts upon the feedback port 67. As a result, the pressure regulating level changes with the signal pressure, as fed to the control port 63, so that the control valve 61 regulates the D-range pressure in accordance with the pressure regulating level and outputs the regulated D-range pressure. In the OFF state with the signal pressure being at the maximilum, on the other hand, the spool 62 is pushed down to the position, as shown at the lefthand half of FIG. 4, so that the D-range pressure is outputted as it comes. In the state with no signal pressure acting upon the control port 63, on the contrary, the spool 62 is pushed up to the position, as shown at the righthand half of FIG. 4, to connect the output port 65 with the d rain port 66.

The output port 65 of the control valve 61 is connected via an orifice 73 and through a fail-safe valve 74 with the first brake B1 and a damper 75. This damper 75 is provided for leveling the oil pressure to a ct upon the first brake B1 and is constructed to include a piston and a spring. In parallel with the orifice 73, there is provided an orifice 76 having a check ball to be opened when the first brake B1 is drained. Moreover, the feedback port 67 of the control valve 61 is connected via an orifice 77 and the fail-safe valve 74 with the first brake B1. Incidentally, this fail-safe valve 74 is fed with not only the line pressure but also the oil pressure of the second clutch C2 as the signal pressure .

Figure 1:
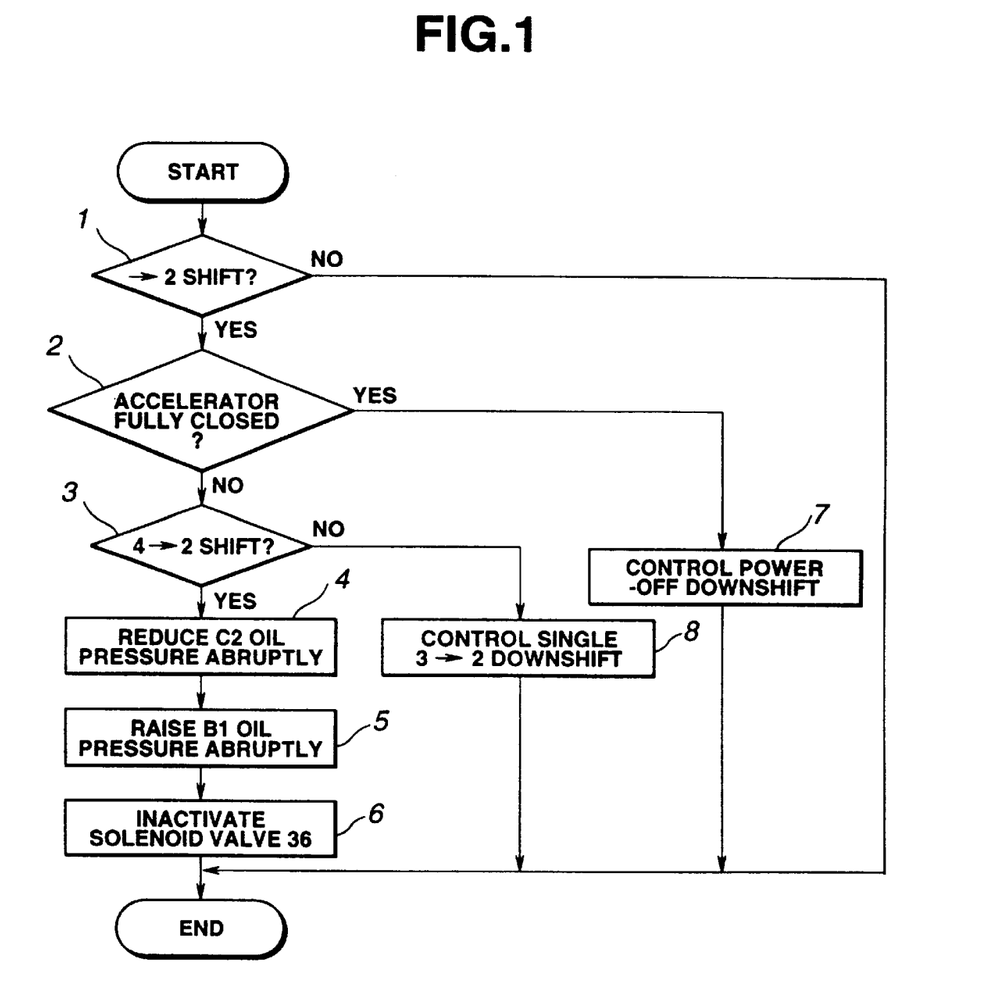
FIG. 1 is a flow chart showing one example of a control routine to be executed in the present invention.

Next, one example of the speed change control of the aforementioned automatic transmission A3 will be described with reference to the flow chart shown in FIG. 1. First of all, while the vehicle is running, the automatic transmission A3 is controlled according to a predetermined shift pattern, and it is decided (at Step 1) on the basis of the accelerator opening of the engine A1 and the vehicle speed whether or not the vehicle is in the running state required for the gear stage of the automatic transmission A3 to be changed to the second speed.

When the answer of Step 1 is YES, it is decided (at Step 2) whether or not the accelerator opening is fully closed, that is, whether or not the running is in the power-OFF state. When the state is power-ON so that the answer of Step 2 is NO, it is decided (at Step 3) whether or not the speed change is skipped from the fourth speed to the second speed. The fourth speed of the automatic transmission A3 is set by applying the first clutch C1 and the second clutch C2 of the first speed change unit A6 and by applying the third clutch C3 of the second speed change unit A7.

At this fourth speed setting time, the oil pressure control system 26 is in the following state. First of all, the solenoid valve 36 is turned ON to apply the signal pressure of its output port 37 to the control port 29 of the 3-4 shift valve 27 so that the spool 28 is moved to the position, as shown at the righthand half of FIG. 4. As a result, the D-range pressure input port 31 and the clutch port 33 communicate with each other so that the D-range pressure is fed to apply the third clutch C3. Moreover, the brake port 32 and the drain port 35 communicate with each other so that the third brake B3 is drained and released.

Moreover, the solenoid valve 53 is at a duty ratio of 0% and outputs the maximum signal pressure, and this signal pressure is applied to the control port 47 so that the spool 46 is moved to the position, as shown at the lefthand half of FIG. 4, against the urging force of the spring 52. This provides the communication between the line pressure input port 48 and the clutch port 49 so that the line pressure is fed to apply the second clutch C2.

Moreover, the solenoid valve 69 is controlled to a duty ratio of 100% to output no signal pressure from the output port 70, so that the spool 62 is stopped at the position, as shown at the righthand half of FIG. 4, by the urging force of the spring 68. This provides the communication between the output port 65 and the drain port 66 so that the first brake Bl is drained and released.

Figure 5A:
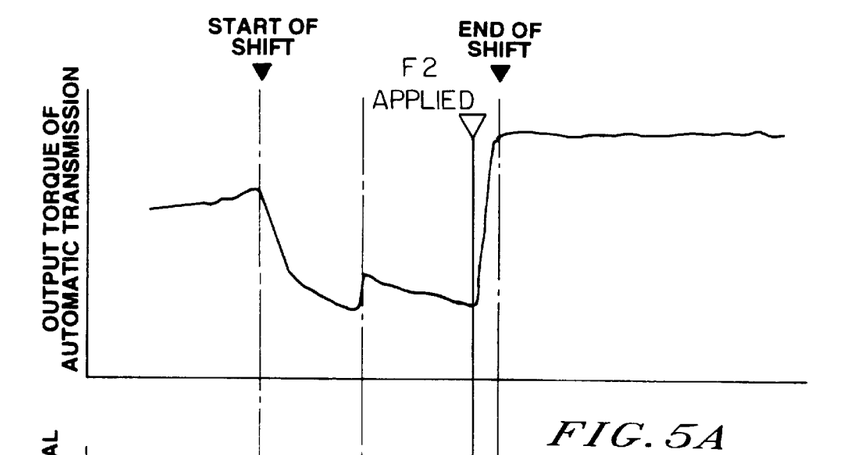
FIG. 5 is a time chart illustrating the changes in the oil pressure on the frictional engagement element and in the output torque of the automatic transmission at the time of a shift from a fourth speed to a second speed by the control shown in FIG. 1.
Figure 5B:
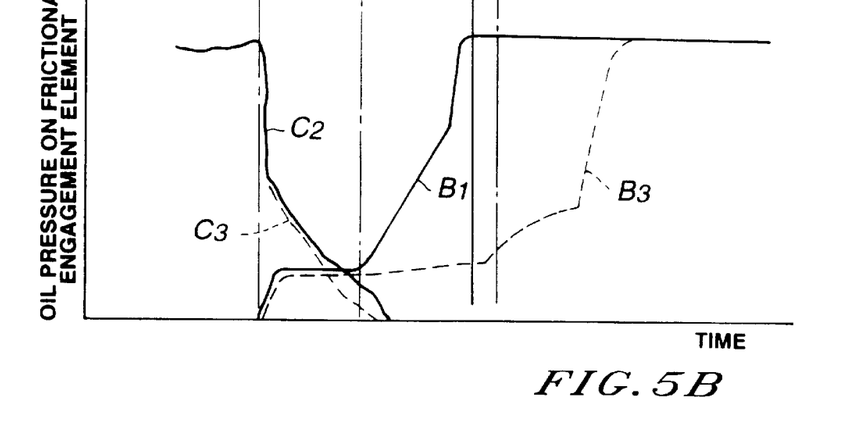

When the answer of Step 3 is YES, the following shift control is executed. First of all, as the duty ratio of the solenoid valve 53 is gradually raised to reduce gradually the signal pressure to be applied to the control port 47. In other words, the regulating pressure level of the control valve 45 is gradually lowered so that the oil pressure being applied to the second clutch C2 is abruptly reduced (at Step 4), as illustrated in FIG. 5.

Together with the aforementioned control of the solenoid valve 53, the solenoid valve 36 is turned OFF so that no oil pressure is applied to the control port 29. Then, the spool 28 is moved toward the control port 29 to provide the communication between the clutch port 33 and the drain port 35 so that the oil pressure to act upon the third clutch C3 abruptly drops, as illustrated in FIG. 5. As the spool 28 moves, the line pressure input port 30 and the brake port 32 communicate with each other so that the line pressure is applied, as illustrated in FIG. 5, to start the application of the third brake B3. Incidentally, the transient oil pressures of those third clutch C3 and third brake B3 are controlled by the accumulators 43 and 40, as respectively attached thereto.

In synchronism with the aforementioned shift start, on the other hand, the solenoid valve 69 is duty-controlled so that the signal pressure to act on the control port 63 of the control valve 61 is gradually raised to raise the pressure regulating level of the control valve 61 gradually. As a result, the oil pressure of the first brake B1 is gradually raised (at Step 5), as illustrated in FIG. 5, so that the first brake B1 starts to be applied.

As the shift advances, the solenoid valve 53 is kept in the ON state so that the second clutch C2 is drained and released, and the solenoid valve 36 is kept in the OFF state so that the third clutch C3 is drained and released.

When the shift control is made to the second speed, as described above, the automatic transmission electronic control unit 25 decides whether or not the shift is just ended, in dependence upon whether or not the turbine RPM NT of the automatic transmission A3 is larger than the difference a product of the output shaft RPM NO of the automatic transmission A3 and the low gear ratio K minus a predetermined value α (that is, NT>K×NO−α). Then, the solenoid valve 69 is kept in the OFF state so that the spool 62 is moved toward the feedback port 67 thereby to apply the first brake B1 completely.

After this, the one-way clutch F2 of the second speed change unit A7 is applied to end the shift so that the output torque of the automatic transmission A3 becomes substantially constant, as illustrated in FIG. 5. This end of shift is decided depending upon whether or not the RPM of the turbine runner 3 of the automatic transmission A3 has reached the synchronous RPM of the second speed. After the shift end, the oil pressure to act upon the third brake B3 is gradually raised so that the solenoid valve 36 is turned OFF (at Step 6) to end the application of the third brake B3.

When the answer of Step 1 is NO, that is, when the set gear stage is to be kept or when the shift is made to a gear stage other than the second speed, this control routine is ended. When the answer of Step 2 is YES, on the other hand, a power-OFF downshift control is made (at Step 7), and this control routine is ended. Since the RPM of the input shaft 4 is not increased by the input torque when in the power-OFF downshift, the so-called "overlap control" is made by keeping the torque capacity of the frictional engagement elements participating in the shift at a considerably high value.

Figure 6A:
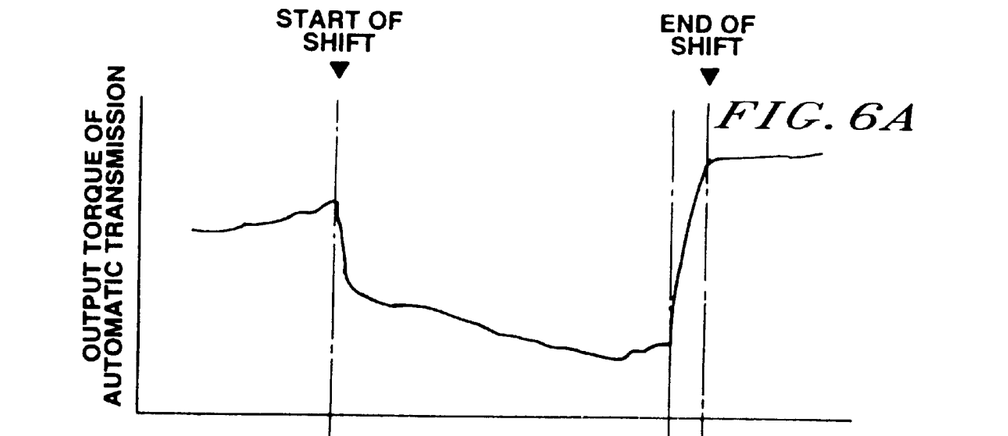
FIG. 6 is a time chart illustrating the changes in the oil pressure on a second clutch and a first brake and in the output torque of the automatic transmission by the control shown in FIG. 1.
Figure 6B:
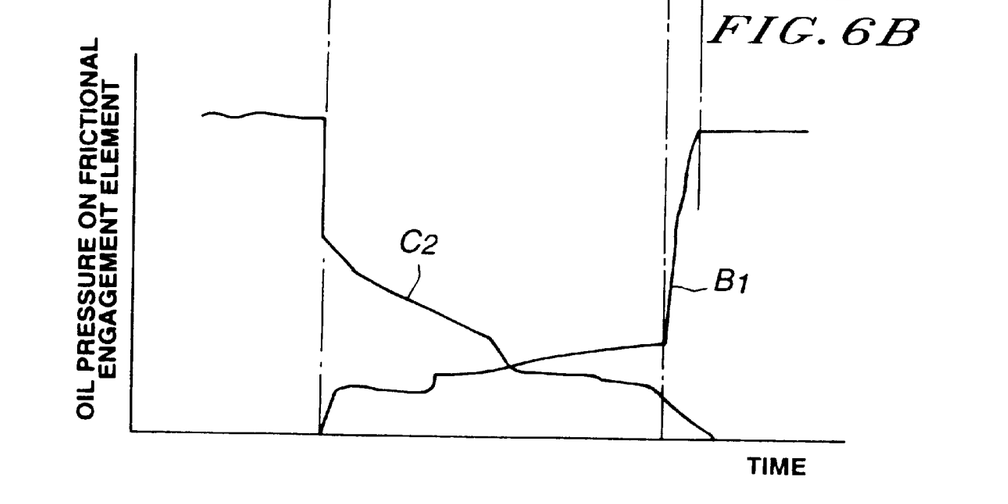

When the answer of Step 3 is NO, as exemplified by the shift from the third speed to the second speed, the oil pressure acting upon the second clutch C2 setting the third speed is reduced, as illustrated in FIG. 6, to start the release of the second clutch C2 thereby to reduce the output torque of the automatic transmission A3 gradually. At the same time, the oil pressure is applied to the first brake B1 for setting the second speed thereby to keep the state having no torque capacity. After this, the shift advances so that the RPM of the turbine runner 3 approaches the synchronous RPM of the second speed. At this instant, the oil pressure to act upon the first brake B1 is abruptly raised so that the solenoid valve 69 is turned OFF to end the application of the first brake B1. Thus, the shift is completed (at Step 8) to end this control routine. In short, the shift is executed by the so-called "under-lap control" of the second clutch C2 and the first brake B1.

Incidentally, the operation of Step 1 corresponds to speed change deciding means of the present invention, and the operations of Steps 4, 5 and 6 correspond to speed change control means of the present invention.

According to this control example, as described above, the one-way clutch F2 of the second speed change unit A7 is applied after the ends of the release of the second clutch C2 and the application of the first brake B1 of the first speed change unit A6. In other words, the second speed change unit A7 is in the neutral state for the time period from the shift start to the shift end, and the shift is executed for the period by releasing the second clutch C2 and by applying the first brake B1 in the first speed change unit A6. As a result, any torque fluctuation, as might otherwise be made by the speed change in the first speed change unit A6, does not appear in the output torque. Even if the apply/release of the second clutch C2 and the first brake B1 should fail to be timed, the shift shock can be prevented to stabilize the driving force of the vehicle thereby to improve the running performance and the riding comforts.

At the time of the skipping shift from the fourth speed to the second speed, moreover, the speed changes are individually proceeded in the first speed change unit A6 and the second speed change unit A7 so that the rotationally changing situations of the first speed change unit A6 and the second speed change unit A7 are not univocally determined. Thanks to the controls thus far described, the skipping shift can be achieved without any shift shock so that the time period for the shift from the fourth speed to the second speed can be shortened to improve the running performance better. Moreover, the present invention can be applied not only to the shift control in which the gear stages are changed one by one but also to a shift to a gear stage other than the second speed.

In the aforementioned control example, on the other hand, the oil pressures to be applied to the first brake B1 and the second clutch C2 of the first speed change unit A6 and to the third clutch C3 and the third brake B3 of the second speed change unit A7 are controlled simultaneously with the start of the shift. However, a delay timer may be provided to control the oil pressures of the first brake B1 and the second clutch C2 of the first speed change unit A3 ahead and to execute the speed change at the second speed change unit A7 after the start of the speed change at the first speed change unit A6. Moreover, the oil pressures of the third clutch C3 and the third brake B3 of the second speed change unit A7 can be controlled after the rotational changes in the members of the first speed change unit A6 are detected to detect the actual start of the speed change at the first speed change unit A6.

The present invention can be further applied the shift control of an automatic transmission in which a first speed change unit having a plurality of frictional engagement elements is connected to the downstream of the torque transmission line of a second speed change unit having a one-way clutch. In the automatic transmission thus constructed, too, the second speed change unit comes into the neutral state to transmit no torque for the time period from the start to the end of the speed change of the second speed change unit. As a result, the speed change to be executed at the first speed change unit exerts no influence upon the output torque of the automatic transmission so that effects similar to those of the foregoing embodiment can be achieved.

Here will be synthetically described the advantages to be attained from the present invention. According to the invention, the clutch-to-clutch shift, in which the frictional engagement elements are simultaneously applied/released at the first speed change unit, is controlled to end in the substantially neutral state before the end of the application of the one-way clutch at the second speed change unit. As a result, the torque fluctuation at the first speed change unit does not appear in the output torque of the automatic transmission so that the discrepancy in the apply/release timings of the frictional engagement elements participating in the clutch-to-clutch shift at the first speed change unit is allowed to some extent. Thus, according to the control system of the present invention, the clutch-to-clutch shift at the first speed change unit can be easily controlled.

What is claimed is:

1. A speed change control system for an automatic transmission, comprising:

a first speed change unit in which a downshift is executed by releasing a first frictional engagement element and applying a second frictional engagement element, a second speed change unit connected to an output member of the first speed change unit, wherein in said second speed change unit a downshift is executed by releasing a third frictional engagement element and applying a one-way clutch when the downshift is executed in the first speed change unit, speed change deciding means for deciding a shift to be executed by the downshift of the first speed change unit and the downshift of the second speed change unit, and speed change control means for establishing the shift by completely releasing the first frictional engagement element and completely applying the second frictional engagement element, each at a time between a start of the releasing of the third frictional engagement element and the applying of the one-way clutch.

2. A speed change control system according to claim 1, further comprising:

pressure regulator means for controlling oil pressures of the first and second frictional engagement elements of the first speed change unit to change continuously, and apply/release control means for controlling the pressure regulator means, when the speed change deciding means decides the shift, such that oil pressures of the first and second frictional engagement elements in the first speed change unit change faster during said downshift than during another speed change.

3. A speed change control system according to claim 2, wherein the pressure regulator means includes a solenoid valve for outputting a signal pressure according to an electric signal, and a pressure regulator valve for outputting a pressure according to the signal pressure.

4. A speed change control system according to claim 1, further comprising:

an accumulator for controlling a change in oil pressure of the third frictional-engagement element in the second speed change unit when the shift is executed.

\* \* \* \* \*